(12) United States Patent
Seki (10) Patent No.: US 6,247,112 B1
(45) Date of Patent: Jun. 12, 2001

(54) BIT MANIPULATION INSTRUCTIONS

(75) Inventor: Takahito Seki, Santa Clara, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/223,105

(22) Filed: Dec. 30, 1998

(51) Int. Cl.⁷ ..................................................... G06F 5/00
(52) U.S. Cl. ........................... 712/42; 712/210; 712/223
(58) Field of Search ............................... 712/42, 210, 223

(56) References Cited

U.S. PATENT DOCUMENTS

| | | | |
|---|---|---|---|
| 5,568,624 | 10/1996 | Sites et al. | 712/223 |
| 5,963,744 | * 10/1999 | Slavenburg | 712/9 |
| 6,052,522 | * 4/2000 | Mattela | 703/13 |

OTHER PUBLICATIONS

Solari, Stephen J., Digital Video and Audio Compression, McGraw–Hill Companies, Inc., 1997, pp. 51–76.

Patterson, David A. and Hennessy, John L., Computer Organization & Design, Morgan Kaufman Publishers, Inc., 1998, pp. 342–399.

"One–to–One Digital Video: Intergrating Encoding and Decoding Technology on One Chip", available online at http:/www.c–cube.com/technlogy/dvx.html, as of Jan. 8, 1998, pp. 1–19.

"LSI Logic's Single Chip Decoding Engine for DVD Applications", available online at http:/www.isilogic.com/products/5_6b3.html, as of Jan. 8, 1998, pp. 1–6.

Gwennap, Linley, "New PA–RISC Processor Decodes MPEG Video," available online at http://hpcc923.external.hp.com/wsg/strategies/parisc3.html, as of Jan. 8, 1998, reprinted from Microprocessor Report: The Insiders' Guide to Microprocessor Hardware, vol. 8, Issue 1, 1994, pp. 1–3.

Imaging Tutorials, Backgrounder: TMS320C80 DSP available at http:/www.precisionimages.com/bgr_c80.html, as of Jan. 8, 1998, pp. 1–4.

* cited by examiner

Primary Examiner—Eric Coleman
(74) Attorney, Agent, or Firm—Finnegan, Henderson, Farabow, Garrett & Dunner L.L.P.

(57) ABSTRACT

Methods and systems for bit manipulation instructions are disclosed. The instruction srlmsk shifts a value stored in a first register based on a shift value stored in a second register and loads N bits from the shift register to a third register using a single instruction. The instruction concat loads the lower N bits from a first register into the high order bits of a second register and loads a subset of least significant bits of a third register to the low order bits of the second register using a single instruction. These instructions may be used to improve variable length encoding and decoding processes.

4 Claims, 6 Drawing Sheets

I-type (immediate)

| op | rs | rt | immediate |
|---|---|---|---|
| 31  26 | 25  21 | 20  16 | 15  0 |

R-type (register)

| op | rs | rt | rd | shamt | funct |
|---|---|---|---|---|---|
| 31  26 | 25  21 | 20  16 | 15  11 | 10  6 | 5  0 |

BIT MANIPULATION INSTRUCTIONS

BACKGROUND OF THE INVENTION

The present invention relates generally to digital computers and processors and, in particular, is directed to methods and apparatus for executing instructions for manipulating digital data.

Digital video technology is increasingly being incorporated into consumer electronic equipment. This video technology is superior to the analog video technology now used in commercial broadcasting and traditional VCRs because it provides improved picture quality and increased editing flexibility. Conventional digital video signals, however, require undesirably wide channels for transmission and undesirably large amounts of memory for storage. To avoid these problems, digital video signals are often "compressed" prior to use thereby making possible advances such as digital broadcast television, digital satellite television, video teleconferencing, and video mail.

Figure 1:
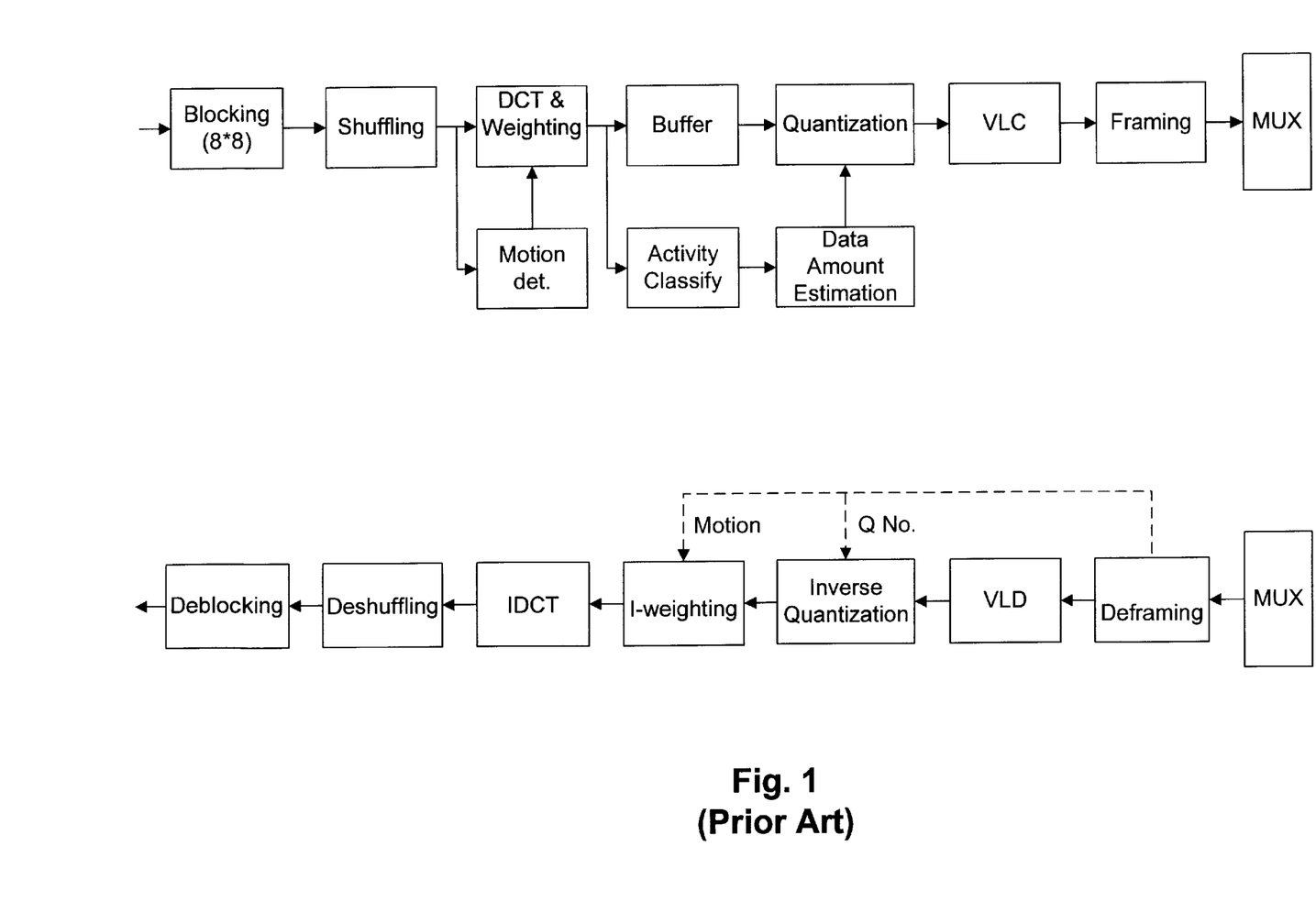
FIG. 1 is a block diagram of a prior art codec.

Digital video signal compression reduces the amount of data by removing redundant information from the signal, thereby reducing the amount of data without affecting the quality of an image produced from the decompressed signal. A video signal processor that performs both compression and decompression of video signals is known as a "codec." FIG. 1 is a basic flow diagram showing data compression ("encoding") and data decompression ("decoding") processes of a prior art codec. For more information regarding the operation of a standard codec, see Stephen J. Solari, Digital Video and Audio Compression (1997), pp. 51–76.

Codecs typically employ some type of computer processor to perform the functions of compression and decompression. Conventional computer central processing units (CPUs) known as "complex instruction set computer" (CISC) processors are characterized by the capability to perform many different types of computer instructions. In particular, CISC processors can perform memory-to-memory instructions with complex memory accesses. In the past, CPUs could execute instructions faster than memory circuits could store or retrieve data. Thus, the complex instructions of CISC processors were used in place of software subroutines, thereby reducing the time that the CPU spent waiting for the memory to deliver instructions and enhancing computer performance.

With increasing memory speeds, however, computer designers have developed "reduced instruction set computer" (RISC) processors that take advantage of the nuances of high-level languages and specially designed hardware architectures. As the name implies, RISC processors use fewer types of instructions than CISC processors. RISC processors achieve high performance by implementing the most common computer instructions directly in hardware, usually at an execution rate of one instruction per clock cycle. Tasks too complex to execute in a single cycle are implemented by programmers by using a series of basic instructions inserted into high-level language instructions ("in-line code") or by calling a subroutine. For more information on RISC processors, see Kane et al., "MIPS R2000 RISC Architecture", Prentice Hall, 1992.

RISC architectures also gain speed by "pipelining," that is, overlapping the execution of instructions which require more than a single clock cycle. In pipelining, instructions that are executed multiple times in a row are divided into discrete portions each requiring one clock cycle and executed in parallel. When the first discrete portion of the first instruction finishes, the second instruction begins execution. With pipelining, each instruction takes the same amount of time to complete, but the overall rate of execution of the instruction set improves.

Designers of special purpose devices, such as, for example, codecs, have incorporated RISC processors into their products to improve performance. The designers often optimize the performance of particular products by extending the normal instruction set of a RISC processor with a set of instructions that are executed repeatedly by a special purpose application program. The present invention provides methods and apparatus for performing bit manipulation that enhance the performance of computer processors by increasing speed. The present invention also provides methods and apparatus for performing bit manipulation that, in particular, improve the performance of digital video codecs.

SUMMARY OF THE INVENTION

Consistent with the present invention, methods for performing and computer-readable media containing instructions for controlling a computer system to perform bit manipulation using a single instruction are disclosed. The method comprises loading N bits from a first register into high order bits of a second register. A subset of least significant bits of a third register are loaded to the low order bits of the second register. All three registers are identified by the single instruction.

A processor for executing a single instruction consistent with the present invention comprises means for loading N bits from a first register into high order bits of a second register and means for loading a subset of least significant bits of a third register to the low order bits of the second register. All three registers are identified by the single instruction.

Furthermore, another method of operating a processor using a single instruction consistent with the present invention comprises the following operations. The processor shifts a value stored in a first register based on a shift value stored in a second register and loads N bits from the shift register to a third register. All three registers are identified by the single instruction.

A processor consistent with the present invention comprises means for executing a single instruction to perform the following operations. The processor includes means for shifting a value stored in a first register based on a shift value stored in a second register and means for loading N bits from the shift register to a third register. All three registers are identified by the single instruction.

A method of transforming a digital data stream into a stream of coefficients representing pixel information of an image is also disclosed. The method comprises loading digital data to a first register of a processor comprising a plurality of registers; identifying a table entry containing run and level based on the digital data; obtaining the run from the table entry using a single instruction identifying registers storing the table entry, a shift value, and the run; obtaining the level from the table entry using a single instruction identifying registers storing the table entry, a shift value, and the level; and storing the run and level to an output register.

BRIEF DESCRIPTION OF THE DRAWINGS

The accompanying drawings, which are incorporated in and constitute a part of this specification, illustrate the invention and, together with the description, serve to explain the principles of the invention.

DESCRIPTION OF THE PREFERRED EMBODIMENTS

Systems and methods consistent with the present invention provide bit manipulation instructions for improving the performance of RISC architecture-based computer systems. The methods and systems consistent with the present invention may be implemented using hardware, software or a combination of hardware and software.

Reference will now be made in detail to exemplary embodiments of the invention which are also illustrated in the accompanying drawings. The description includes exemplary embodiments, other embodiments are possible, and changes may be made to the embodiments described without departing from the spirit and scope of the invention. Wherever possible, the same reference numbers will be used throughout the drawings to refer to the same or like parts.

A. System Overview

Figure 2:
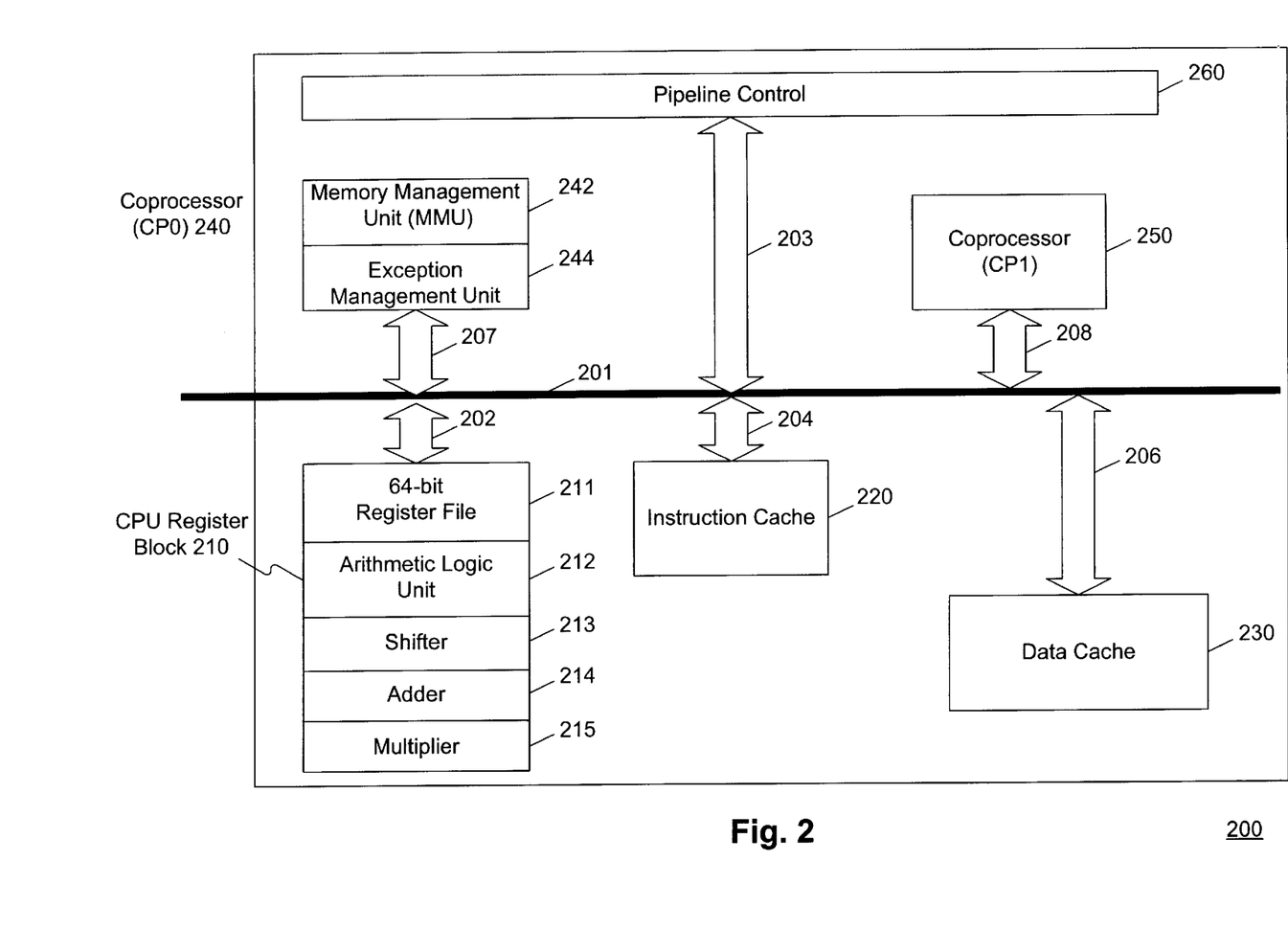
FIG. 2 is a block diagram of a central processing unit (CPU) consistent with the present invention.

FIG. 2 illustrates the system architecture for a central processing unit (CPU) 200 consistent with the present invention. CPU 200 includes a CPU register block 210, an instruction cache 220, a data cache 230, a coprocessor (CP0) 240, a coprocessor (CP1) 250, and pipeline control 260. Components 210, 220, 230, 240, 250, and 260 are interconnected via connectors 202, 203, 204, 206, 207, and 208 and are capable of passing data, instructions, and control commands via a standard bus 201. CPU 200 may be, for example, a MIPS R-series processor as described in "MIPS RISC Architecture," Prentice-Hall, 1992, by Kane, G. et al, pp. 2-1 to 2-25. Consistent with the present invention, CPU 200 may be, for example, a single-chip integrated circuit device or a multi-chip configuration.

CPU register block 210 includes a register file 211, a shifter 213, an adder 214, and a multiplier 215. Arithmetic logic unit (ALU) 212 may be included in CPU register block 210 as shown in FIG. 2 or may be directly connected to bus 201. Register file 211 is a collection of registers in which any register can be read or written by specifying the number of the register in the file. Each register is capable of storing a single word having N bits. Word length, N, may be any positive integer, however, conventional registers generally store 32- or 64-bit words. ALU 212 is a unit that retrieves data from the registers, performs arithmetic and logical operations on the contents, and stores the result to a register. Shifter 213 is a register in which a clock pulse causes the data stored in the register to move to the left or right some numbers of bit positions. Adder 214 is a register that stores the address of the next instruction and, once the address is used, increments the current address to obtain the address of the next instruction.

Instruction cache 220 and data cache 230 are high-speed memories that locally store instructions and data that are repetitively accessed by CPU 200. Cache memories improve processor performance by reducing the number of references that must be made to the slower-speed main memories.

CP0 240 is a system control coprocessor comprising a memory management unit (MMU) 242 and an exception management unit 244. MMU 242 is a circuit that manages the swapping of information between memory locations processed by CPU 200. Exception management unit 244 handles exceptions, or unusual events, that occur during processing. Exceptions include, for example, arithmetic overflow, input/output interrupts and other errors.

CP1 250 is a coprocessor of CPU 200 that performs arithmetic operations on floating-point values. CP1 may be, for example, a MIPS Floating-Point Unit (FPU) that conforms to the requirements of ANSI/IEEE Standard 754-1985, "IEEE Standard for Binary Floating-Point Arithmetic." Pipeline control 260 is a processor component that breaks the execution of instructions into component parts and controls the execution of multiple component parts of multiple instructions in parallel.

B. Instructions

Figure 3:
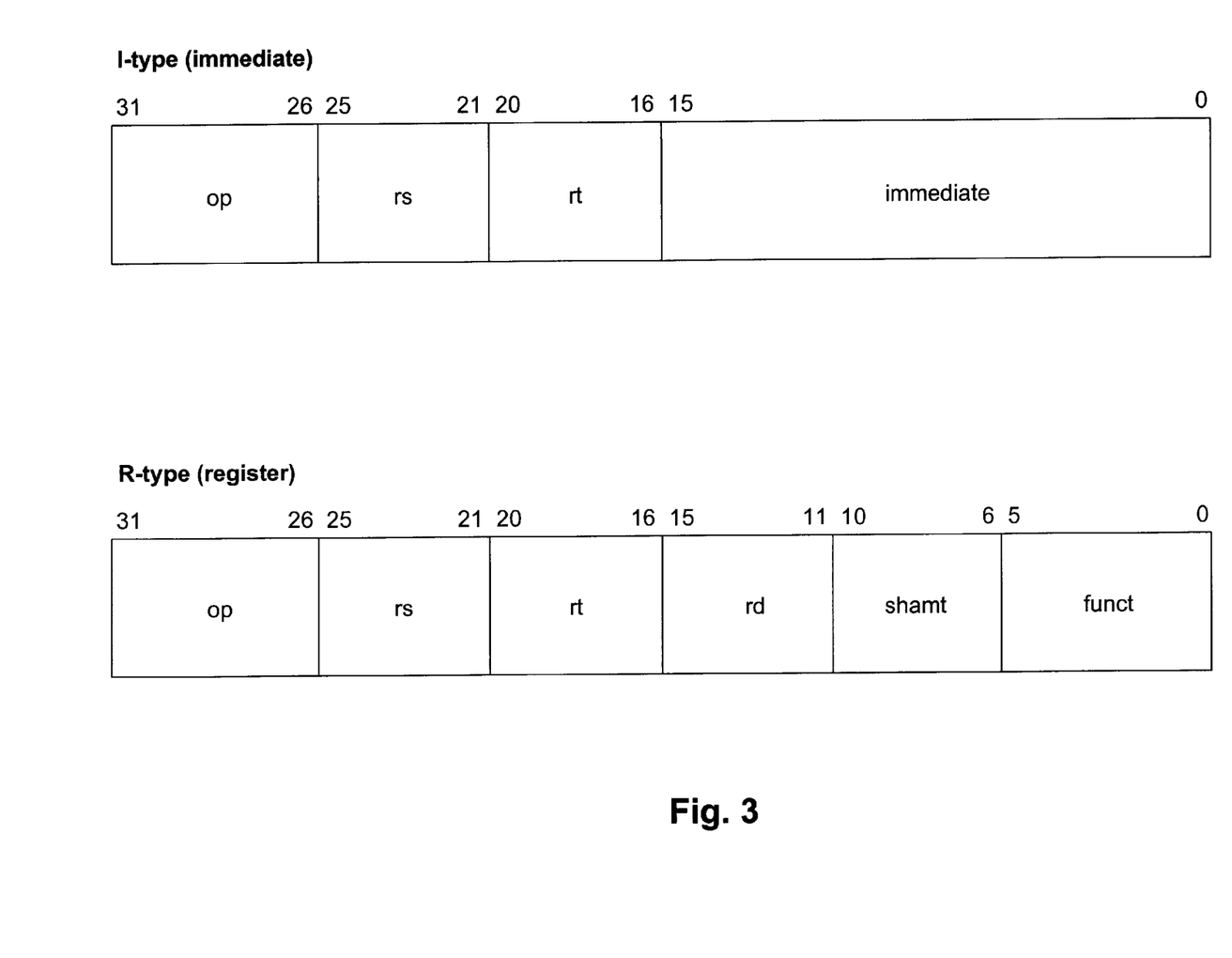
FIG. 3 is a functional representation of an instruction consistent with the present invention.

FIG. 3 is a diagram showing instruction formats used for operating a CPU 200 consistent with the present invention. As shown in FIG. 3, one type of format is an "immediate" format, or "I-type." I-type instructions move data between memory and general registers. I-type instructions typically contain a 6-bit operation code (or "opcode"), followed by two 5-bit register address fields, and a 16-bit immediate offset. The "rs" field is the address of a "source" register, and the "rt" field is the address of a "target" destination register. The immediate offset value may be added to the contents of the target register address "rt" to form an intermediate address. The instruction then loads information from or stores information to the intermediate address.

"Register" ("R-type") instructions are used to perform arithmetic, logical, and shift operations on values in registers. R-type instructions typically comprise a 6-bit opcode and three 5-bit register address fields—two source register addresses, "rs" and "rt", and a destination register address "rd." The remaining 11 bits may be used for designating a shift amount ("shamt") and an arithmetic function ("funct"). In MIPS 32-bit instructions, the shift amount field is five bits long and the arithmetic function field is six bits long. As shown in FIG. 3, the opcode is contained in bits 31–36, the rs field in bits 25–21, and the rt field in bits 20–16. In an R-type instruction, the destination register field in bits 15–11.

Figure 4:
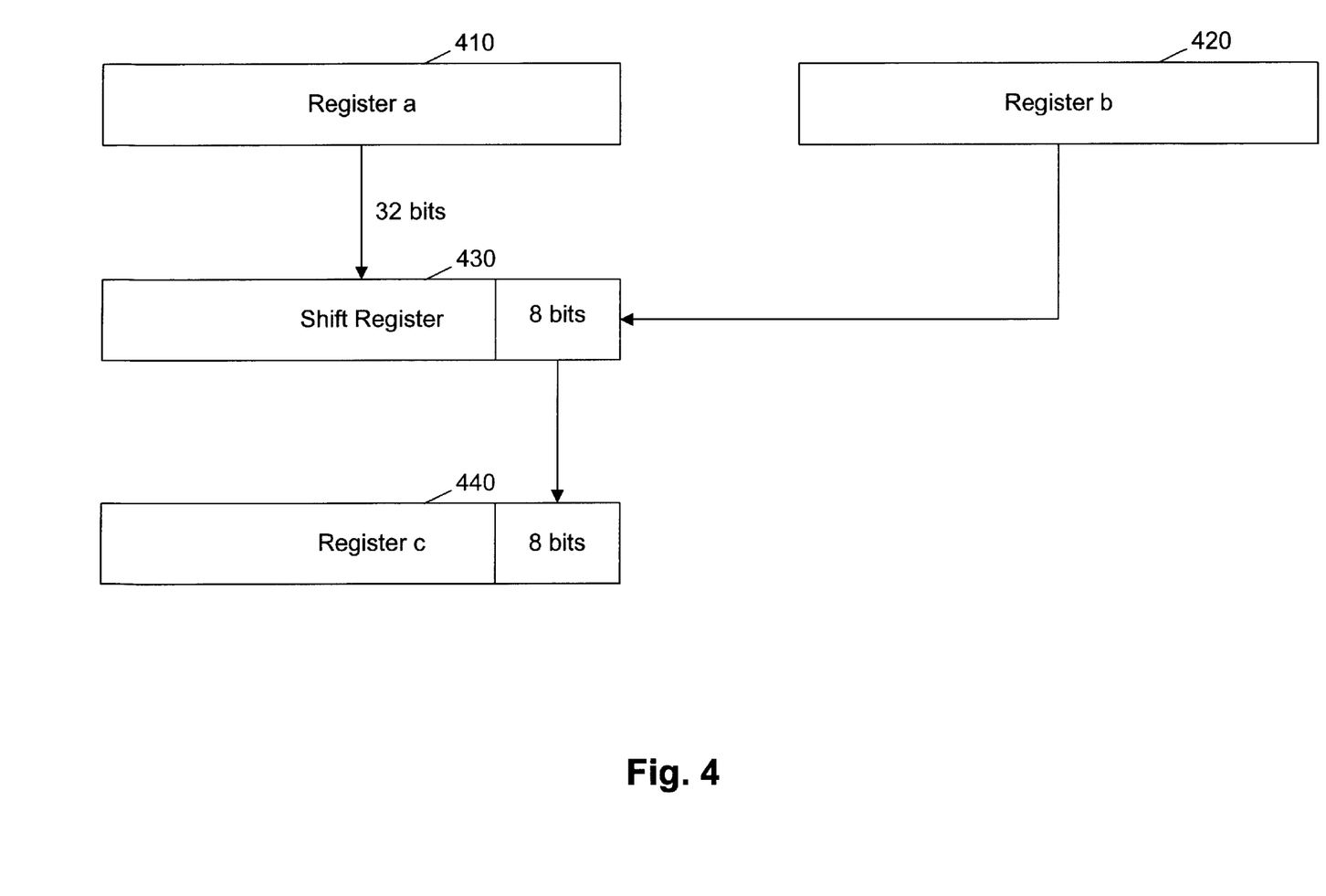
FIG. 4 is a functional representation of an instruction consistent with the present invention.

FIG. 4 shows a functional representation of an instruction srlmsk consistent with the present invention. As is commonly known by those skilled in the art, a character following a dollar sign is used to represent a register. The srlmsk instruction has the general format, srlmsk $c, $a, $b, where $a, $b, and $c specify registers of the type found in register file 211 shown in FIG. 2. The srlmsk instruction is executed in a series of stages beginning when the srlmsk instruction is fetched from memory. The contents of register a 410 is read into a shift register 430. The contents of shift register 430 are then shifted to the right by a number of places equal to the value in register b 420. The lower eight bits of shift register 430 are then stored to register c 440.

Figure 5:
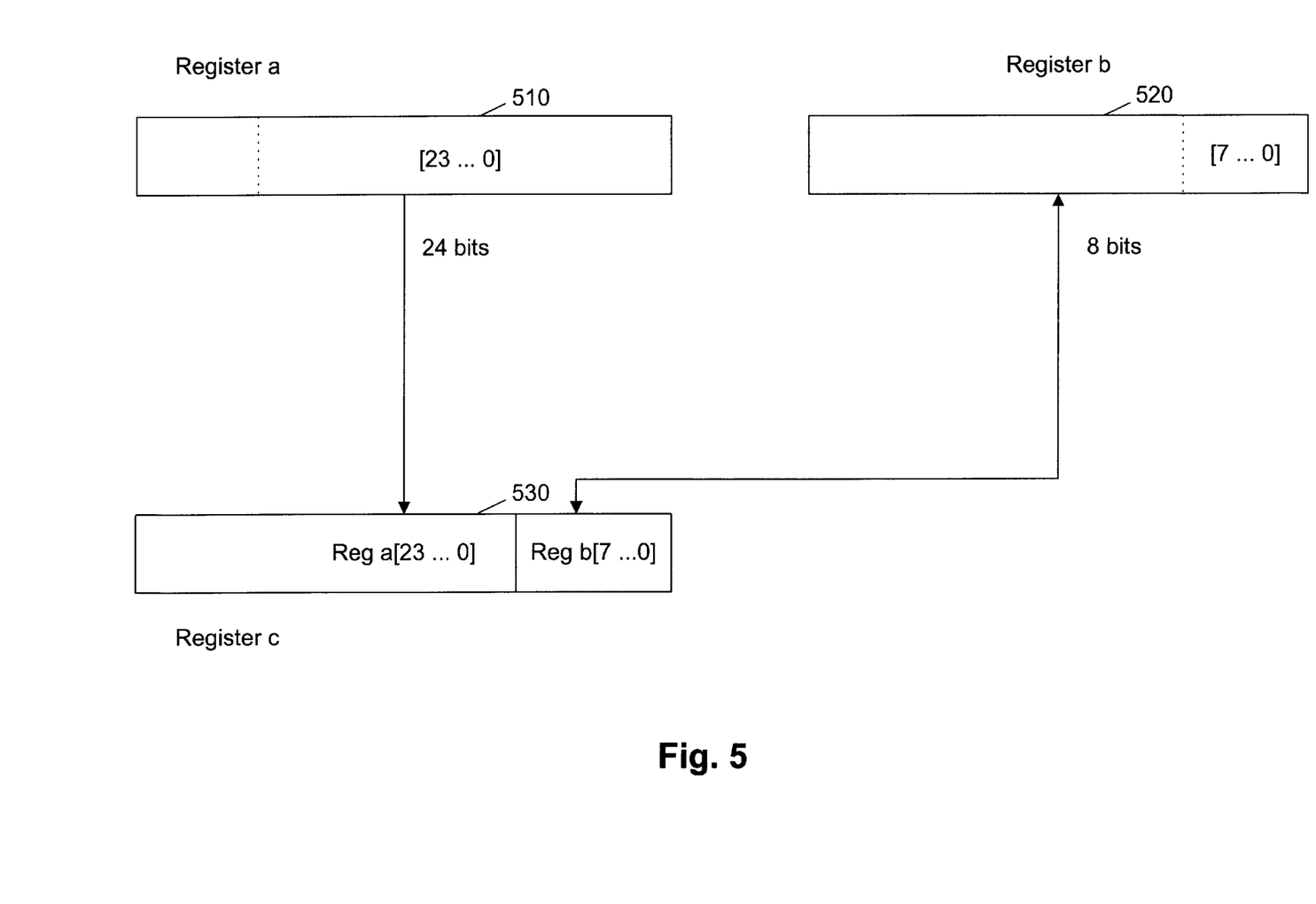
FIG. 5 is a block diagram of a system consistent with the present invention.

The functional representation of another instruction consistent with the present invention is shown in FIG. 5. The concat instruction has the general format, concat $c, $a, $b, where $a, $b, and $c specify registers of the type found in register file 211 shown in FIG. 2. The concat instruction is executed in a series of stages beginning when the concat instruction is fetched from memory. As shown in FIG. 5, low-order bits 23 through 0 of register a 510 are read into bits 31 through 8 of register c 530, and the bits 7 through 0 of register b 520 are read into bits 7 through 0 of register c 530.

C. Variable Length Decoding

Consistent with the present invention, instructions, such as srlmsk and concat, may be used to decrease the processing time of processes such as variable length encoding and decoding. Variable length decoding is the reverse of variable length coding performed during one stage of video encoding. In video encoding, blocks of image data are transformed into a weighted sum of spatial frequencies of the underlying pixel information using a discrete cosine transform (DCT). Each resulting spatial frequency has a corresponding DCT coefficient that can be "quantized" by dividing the coefficient by a nonzero positive integer and rounding the quotient. Coefficients representing high spatial frequencies are almost always zero, whereas low-frequency coefficients are often nonzero. A two-dimensional matrix of quantized coefficients is converted into a one-dimensional linear stream of coefficients by reading the matrix values in a zigzag pattern.

Variable length coding compresses the resulting linear stream by dividing the stream into segments consisting of a string of zero coefficients followed by a non-zero quantized coefficient. Each segment is then coded by replacing the segment with a variable length code (VLC) corresponding to the segment's run and level. "Run" refers to the number of zero coefficients before the next nonzero coefficient. "Level" refers to the amplitude of the nonzero coefficient. A run/level of 8/2, for example, indicates a segment containing eight zeros followed by a nonzero coefficient with amplitude equal to 2. Run/level coordinates are used to look up the corresponding VLC in a table. Each segment is replaced with a VLC and the length of the VLC in bits. The end of the digital stream is coded with an end-of-block (EOB) signal coding all of the trailing zero coefficients in the linear coefficient stream.

Variable length decoding (VLD) is the reverse of the VLC process. VLD is used to extract the original sequence of coefficients from a compressed digital stream. For more information regarding the variable length encoding and decoding, see Joan L. Mitchell et al., MPEG Video Compression Standard (1997), pp. 92–99.

Figure 6:
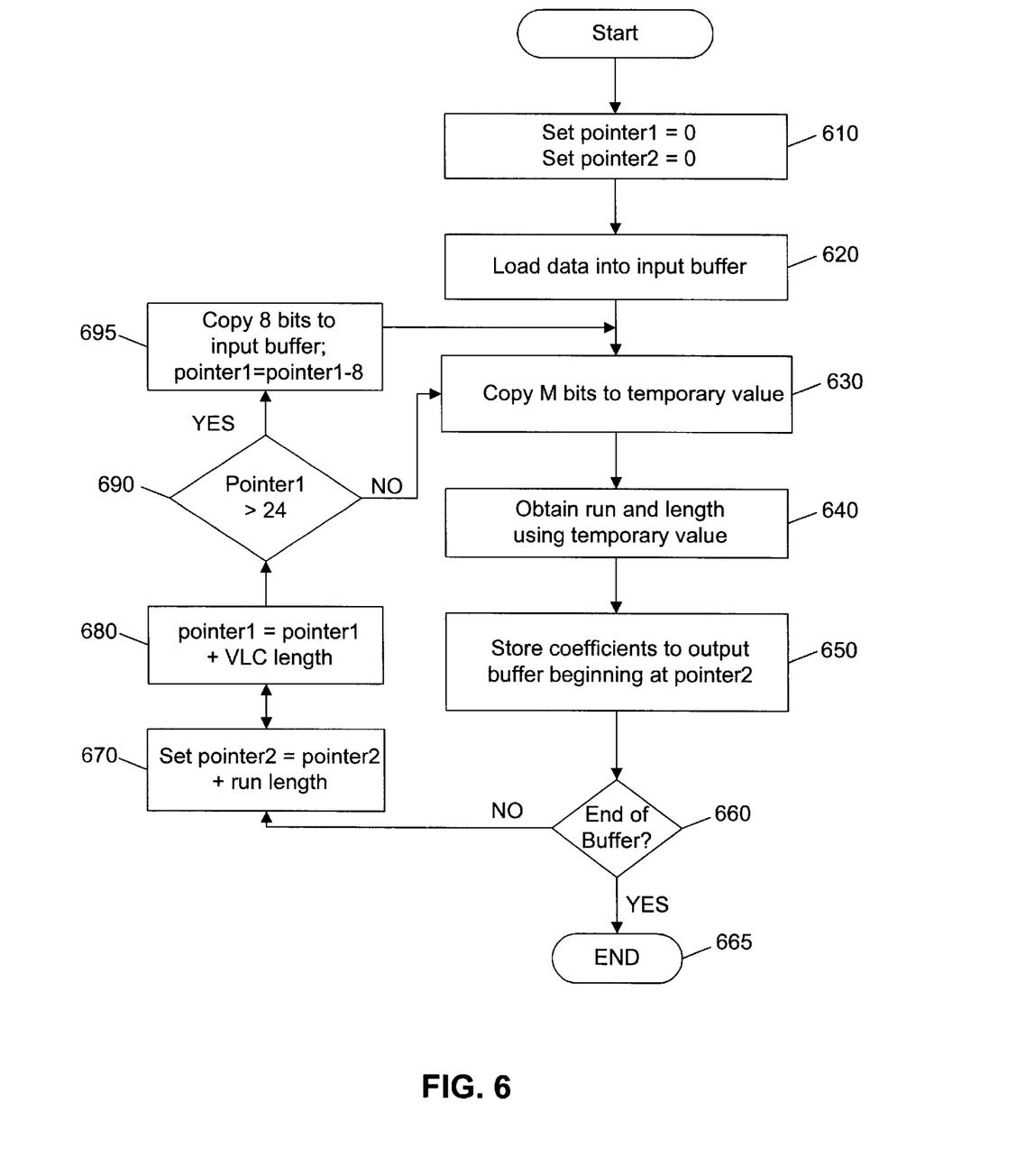
FIG. 6 is a flow diagram of a method consistent with the present invention.

FIG. 6 is a flow chart illustrating steps for implementing a VLD process using instructions consistent with the present invention. To begin, pointer1 and pointer2 are set to zero (stage 610). Pointer1 marks the position from which to begin retrieving data from the input buffer. Pointer2 marks the starting position in the output buffer. To begin, digital data is loaded into an input buffer (stage 620). The input buffer may be, for example, one of the registers of CPU Register Block 210 shown in FIG. 2. The input buffer may hold any number of bits, however, most conventional registers store 32 or 64 bits. For the purposes of this example only, it is assumed that the input buffer is a 32 bit register and that data will be read from or stored to a register from left to right which is from higher order bits to lower order bits.

The data in the input buffer will be decompressed by using segments of the data in the input buffer to obtain the original DCT coefficients. Using conventional notation, bit 31 of a register indicates the leftmost, high order bit in the register while bit 0 is the rightmost, low order bit in the register. Beginning at bit 31-pointer1 (assuming a 32 bit register), M bits of the input buffer are copied to a temporary value (stage 630). The temporary value may be, for example, a VLC that identifies an entry in a table that contains the level, run, and run length. The run indicates the number of zero entries preceding a nonzero coefficient with amplitude equal to the level. For example, each entry in the table may have the form:

$$\text{entry} = (\text{level} << p) | (\text{run} << q) | \text{run length}$$

where p and q depend on the amount of bits used to store the run length and run. For example, if both the run length and run are stored using eight bits each, then p=16 and q=8.

The temporary value identifies the table entry (stage 640). Using the example above, the lowest 8 bits (bits 7–0) store the run length. The next higher 8 bits (bits 15–8) store the run. Finally, the upper 16 bits (bits 31–16) store the level. The run length, run, and level may each be extracted using, for example, the srlmsk instruction described above. The instruction srlmsk $c, $a, $b, where $a is equal to the entry as described above and $b is a register storing the value q, will store the run to register $c. If the instruction srlmsk $c, $a, $b is executed with $b storing the value p, the instruction will store the level to register $c.

The run and level may be used to reconstruct the quantized coefficient stream. Beginning at pointer2 in the output buffer, a number of zeros equal to the run and a coefficient with amplitude equal to level are stored in the output buffer (stage 650). Consistent with the present invention, the zeros and the coefficient may be stored to the output buffer end-to-end using concatenation. The concatenation process may be accomplished by a processor executing the instruction concat as illustrated in FIG. 5. The instruction concat $c, $a, $b, for example, would concatenate the contents of registers $a and $b and store the result in register $c.

If the temporary value equals the EOB symbol (stage 660), the remainder of the string contains zero entries and the process is terminated (stage 665). If no EOB symbol is encountered, pointer2 is incremented by the length of the run and level, which equals the value of run plus one (stage 670). Pointer1 is incremented by VLC length (stage 680). If pointer1 is greater than 24 (stage 690), then get the next eight bits in the input buffer using, for example, the concat instruction (stage 695). Pointer1 is decremented by eight (stage 695), and the process continues at stage 630. If pointer1 is less than 24, the process continues with stage 630.

Methods and apparatus consistent with the present invention may be implemented in software, hardware, or a combination of hardware and software. Software implementations of the invention are preferably embodied in a computer-readable media, such as a magnetic disk, or transferred over computer-readable media, such as the Internet.

It will be apparent to those skilled in the art that various modifications and variations can be made in the methods and systems consistent with the present invention without departing from the spirit or scope of the invention. For example, the instructions srlmsk and concat could also be used in the variable length encoding process. The true scope of the claims is defined by the following claims.

What is claimed is:

1. A method of transforming a digital data stream into a stream of coefficients representing pixel information of an image, the method comprising:
    loading digital data to a first register of a processor comprising a plurality of registers;
    identifying a table entry containing run and level based on the digital data;
    obtaining the run from the table entry using a single instruction identifying registers storing the table entry, a shift value, and the run;

obtaining the level from the table entry using a single instruction identifying registers storing the table entry, a shift value, and the level; and storing the run and level to an output register.

2. The method of claim 1, wherein storing the run and level to an output register comprises:

generating a number of zeros equal to the run to an output buffer;

concatenating the level with the number of zeros and storing the result to an output register using a single instruction.

3. A processor for executing instructions to transforming a digital data stream into a stream of coefficients representing pixel information of an image, the processor having a set of registers and comprising:

means for loading digital data to a first register;

means for identifying a table entry containing run and level based on the digital data;

means for obtaining the run from the table entry using a single instruction identifying registers storing the table entry, a shift value, and the run;

means for obtaining the level from the table entry using a single instruction identifying registers storing the table entry, a shift value, and the level; and means for storing the run and level to an output register.

4. The processor of claim 3, wherein the means for storing the run and level to an output register comprises:

means for generating a number of zeros equal to the run to an output buffer;

means for concatenating the level with the number of zeros and storing the result to an output register using a single instruction.

* * * * *